(12) United States Patent
Lang et al.

(10) Patent No.: US 6,630,888 B2
(45) Date of Patent: Oct. 7, 2003

(54) REARVIEW MIRROR ASSEMBLY WITH INTEGRAL DISPLAY ELEMENT AND CAMERA

(75) Inventors: Heinrich Lang, Ergersheim (DE); Christopher Renner, Ipsheim (DE); Wolfgang Seiboth, Bad Windsheim (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 10/154,430

(22) Filed: May 23, 2002

(65) Prior Publication Data

US 2003/0016125 A1 Jan. 23, 2003

Related U.S. Application Data

(63) Continuation of application No. 09/304,168, filed on Apr. 30, 1999, now abandoned, and a continuation of application No. 09/303,503, filed on Apr. 30, 1999, now abandoned.

(30) Foreign Application Priority Data

| Jan. 22, 1999 | (DE) | 199 02 486 |
| Jan. 22, 1999 | (DE) | 199 02 487 |
| Jan. 29, 1999 | (DE) | 199 03 595 |

(51) Int. Cl.[7] .............................. G08B 5/22; B60Q 1/00
(52) U.S. Cl. .............................. 340/815.45; 340/425.5; 340/426; 362/494; 362/800; 359/844; 348/143; 348/148
(58) Field of Search ................ 340/815.45, 425.5, 340/426; 362/494, 800; 359/844; 348/148, 143

(56) References Cited

U.S. PATENT DOCUMENTS

| 4,630,904 A | * 12/1986 | Pastore ........................ 350/600 |
| 5,207,492 A | * 5/1993 | Roberts ........................ 362/30 |
| 5,253,115 A | * 10/1993 | Ueno ........................ 340/465 |
| 5,285,060 A | * 2/1994 | Larson et al. ................ 340/461 |
| 5,631,638 A | * 5/1997 | Kaspar et al. ............... 340/905 |
| 5,786,772 A | * 7/1998 | Schofield et al. ............ 340/903 |
| 5,910,854 A | * 6/1999 | Varaprasad et al. ......... 359/273 |

* cited by examiner

*Primary Examiner*—Donnie L. Crosland
(74) *Attorney, Agent, or Firm*—Dority & Manning, P.A.

(57) ABSTRACT

A mirror assembly for a vehicle includes a housing configured for attachment to the vehicle, and a mirror pane configured for attachment to the housing. The mirror pane has a reflective surface defining a first portion and a second portion, the reflective surface being partially removed such that the first and second portions are partially reflective and partially transmissive. At least one picture taking apparatus is located on a rear side of the mirror pane and adjacent the first portion of the mirror pane, and a sensor is located on the rear side of the mirror pane for sensing an ambient light level. A radiation emitting element is located on the rear side of the mirror pane, the second portion being disposed in front of the radiation emitting display element such that the radiation emitting element emits light at least partially through the second portion. The radiation emitting element is activated upon the sensor element sensing an ambient light level below a predetermined level.

10 Claims, 2 Drawing Sheets

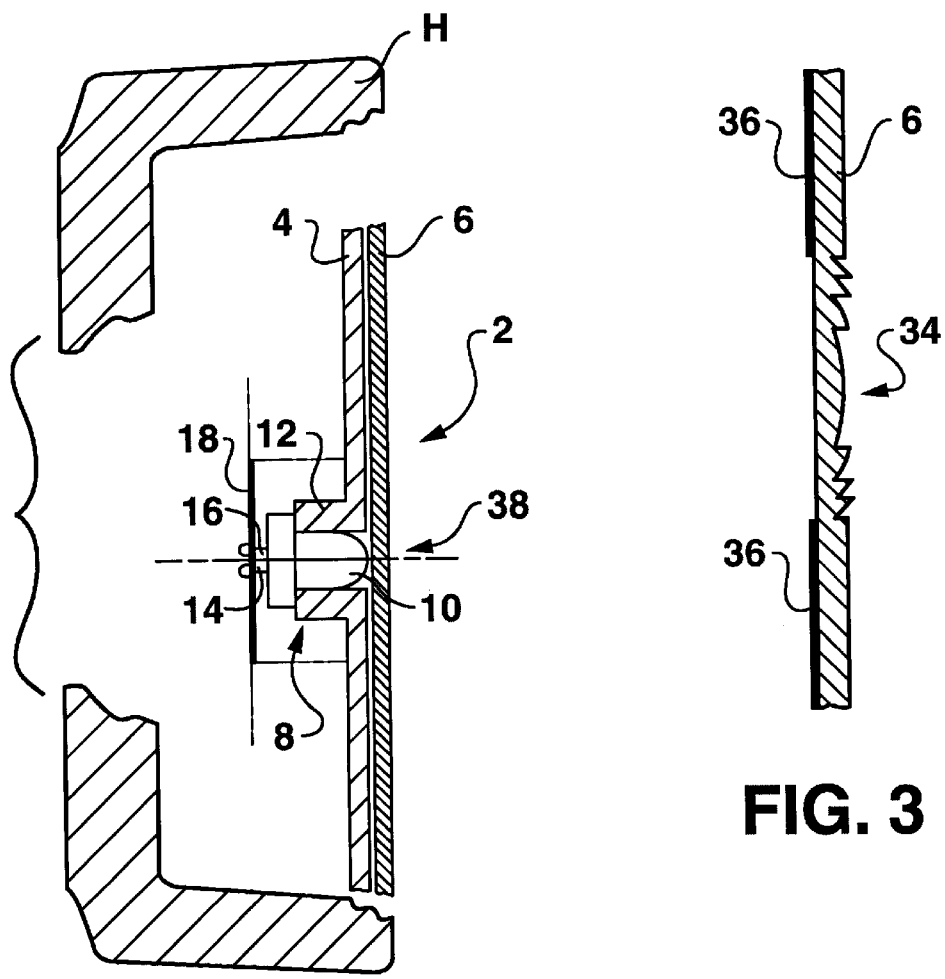
FIG. 1
FIG. 3
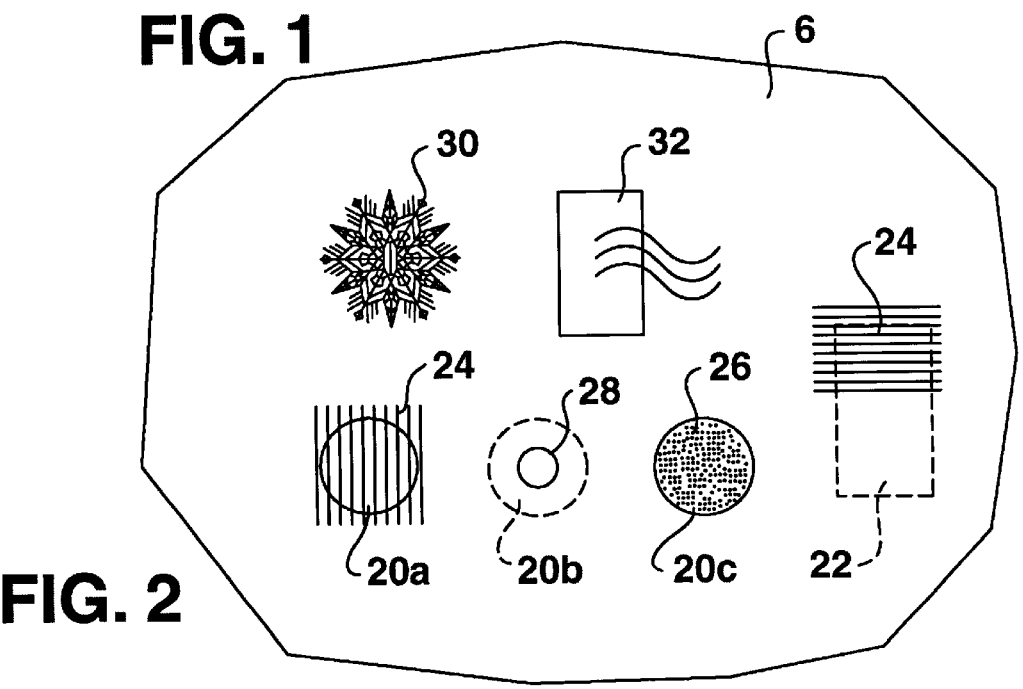
FIG. 2

REARVIEW MIRROR ASSEMBLY WITH INTEGRAL DISPLAY ELEMENT AND CAMERA

RELATED APPLICATIONS

The present application is a Continuation Application of U.S. application Ser. No. 09/304,168, filed Apr. 30, 1999, now abandoned incorporated by reference herein, claiming priority under 35 U.S.C. §119 to Patent Application DE 199 02 487.1, filed Jan. 22, 1999 and U.S. application Ser. No. 09/303,503, filed Apr. 30, 1999, now abandoned incorporated by reference herein, claiming priority under 35 U.S.C. §119 to Patent Applications DE 199 02 486.3, filed Jan. 22, 1999 in the German Patent Office and DE 199 03 595.4, filed Jan. 29, 1999 in the German Patent Office.

FIELD OF THE INVENTION

The invention generally concerns a rearview mirror, particularly for motor vehicles, having an integral display element and a picture taking device.

BACKGROUND OF THE INVENTION

It is common knowledge to equip vehicles with so-called back-up aid facilities, which feature one or more sensors. The sensors may, for instance operate on an ultrasonic basis and be placed on the rear of the vehicle. Evaluation and display apparatuses, connected to said sensors, may be placed in the cockpit or the driver's compartment. In particular, for large commercial vehicles, such trucks as semi-trailers, articulated vehicles, and the like, back-up aid facilities furnish great help for the driver. With such help in back-up maneuvering, a display can be made of the distance to an obstruction or to a target of the maneuvering, for instance, to a loading dock. The sensor(s) placed at the rear of a vehicle determine the distance to an obstruction or the said target and this distance is displayed on a monitor in the driver's compartment. The distance can be shown either directly in meters and centimeters by means of a seven segment display, or the display will exhibit one or more of preferably different colored signal lamps (Light Emitting Diodes, hereinafter LEDs) by means of which the distance to an obstruction or the target of the maneuvering is shown in definite increments. Additionally, acoustic signals can be employed.

Where back-up maneuvering is concerned, the driver is, in great measure, dependent upon the information, which is seen in the outside rearview mirror. With the aid of the rearview mirrors, which are, as a rule, on both sides of the cab, the driver is in a position to maneuver safely. This depends, of course, on appropriate know-how and experience. In connection with a back-up aid of the described kind, very large vehicles with a non-visible rear area can maneuver with safety.

The disadvantage in the described situation is that during the maneuvering with the help of the two rearview mirrors and the back-up aid, the driver's attention is being given continually to one of the two rearview mirrors, or between two rearview mirrors, and must then wander also to a display arranged on or in the instrument board. This stresses the concentration and also impairs the exactness of judgement regarding the images in the mirrors or in the back-up aid display. The latter is particularly significant if very highly contrasting brightness conditions exist between the image in the rearview mirrors and that of the back-up aid display, since the eye always requires a certain elapsed time to adapt to a bright-dark, dark-bright change in the viewing field. Further, the image in the rearview mirror(s) and the display, as a rule, lie at different distances, so that the eye in the continual change of view requires also a certain accommodation time for this. All these factors add up to the point that upon back-up maneuvering with the help of the rear view mirrors and the display of a back-up aid a great deal of know-how and concentration are expected from the driver during the operation.

As introduced above, the drivers of trucks or other vehicles have available very little, if any, field of sight to the rear. These drivers, when backing or maneuvering, are especially dependent upon one or the other of the external rearview mirrors in order to maneuver safely. In practice, often a single mirror with a single mirror pane or glass does not suffice, even when there is respectively one mirror to the left and another to the right, that is to say, one mirror placed on the driver's side and one on the passenger's side. A single mirror is, in most cases, not in a position to reflect to the driver all the important zones to the sides and rear of the vehicle. Thus it has become known, to place on the sides of the vehicle a plurality of mirrors with differently adjusted angles to enable the driver to have the great possible panoramic field of view. An installation of such a plurality of rearview mirrors is, however, costly, deteriorates the streamlining of the vehicle, and thus increases the consumption of fuel. In the case of certain vehicles, particularly busses, this is also not desirable from the standpoint of design. Further, with an increasing number of mirrors, the number of mirror surfaces likewise increases. This naturally increases the possibilities of breakage.

In the case of a change of drivers, then the position of the majority of the mirrors must also be set anew, which is time consuming and likewise impractical. In addition, all mirror surfaces must be regularly cleaned and provided with heating apparatuses, in order to assure a continuous line of sight to the rear.

SUMMARY OF THE INVENTION

The invention creates a rearview mirror, which enables the driver of a vehicle to accept along with the information communicated to him by the rearview mirrors additional information without having to take his eyes off the rearview mirrors.

To achieve the above purpose, the present invention proposes a rearview mirror, particularly for motorized vehicles, with a mirror pane, wherein in the top view direction, behind the mirror pane, is placed at least one radiation emitting, display element, which radiates through the mirror pane.

Within the scope of the present invention, there would be one radiation emitting display element located behind the mirror pane, whereby this display element would emit its radiation through the mirror pane.

Mirror panes, for instance such as Chrome-glass, to a certain degree are transparent for such radiation as enters through the back side of the mirror pane.

At the same time, the mirror panes remain reflective and mirror-like, when seen from the front side. The present invention makes use of this, since it places at least one radiation emitting display element behind the mirror pane. This display, associated with this element, for an observer in front of the mirror, lies, more or less in the mirror pane plane and the information transmitted by the display element appears through the mirror pane "in" the usual reflected image, which is reflected from the mirror pane.

In this way, it is possible to place the emitting display element(s) of back-up aid facilities, in accord with the teachings of the present invention, behind the mirror pane. When this is done, these display elements merge their corresponding information through the mirror pane, blending into the reflective image on the mirror pane. The observer then receives thus, at one glance, information from the mirror image on the mirror pane, as well as information from the display element(s). The view of the driver need no longer be divided between the mirror and a separate display apparatus. The driver's view need not wander back and forth to the instrument panel, but his attention remains, during the back-up maneuver, solely on the mirror. This is the result of all the collected data for the back-up operation being presented at one glance. More precise and fatigue-free driving becomes possible by these measures.

The display element can radiate in the spectrum of either visible or infrared light. In practice, the emission of light in the visible spectrum is used in the majority of cases, since with such light a direct optical display is possible. For certain applications, an emission of infrared can be of interest, for instance, for information which is not visible to the naked eye, or for coding between the vehicle and a stationary point for supervision and registration. In this regard, it should be mentioned that the object of the present invention is directed toward bringing radiation emitting display elements in general behind the mirror pane.

A direct visual information transmission to the driver by means of these display elements is only a possible and an especially advantageous application of the concept of the invention. In accord with a further embodiment, a plurality of light radiating display elements may advantageously be assembled in groups behind the mirror pane. In this case it becomes possible to transmit even more complex data for instance a decreasing spatial interval between the tail gate of the vehicle and an obstruction or target of maneuvering while backing up. Alternatively, for instance, a longer series of display elements may be utilized set next to each other, among which one or the another is either active or inactive, if the tail gate of the vehicle nears an obstruction or the target of back-up maneuvering. The method of function in this case is that as the approach comes to a minimal distance, either all display elements deactivate or cause a display light-up in the form of a figurative barrier. A further possibility in the presentation of information would be enabling a blinking display, the frequency of which is directly proportional to the distance to the obstruction or the target of the backing-up maneuvering.

Preferably, LEDs serve as display elements, in particular high capacity LEDs. Preference is given because of small size, modest power demands, high life expectancy, freedom from sensitivity to vibration and impact, and availability in various dimensions and shapes. A further advantage is also obtained, when, in accord with a further embodiment, the LEDs are of varied colors. By this means, the data content, which can be transferred through the mirror pane, can still be amplified.

Instead of, or in addition to LEDs, the display elements can activate one or more "seven segment" displays. In this case, it is possible to display the intervening distance from the tail gate of the vehicle to the obstacle or target of the back-up maneuvering, in direct analog form, i.e. in meters or centimeters. Also other data such as the outside temperature, the assured clear distance to the preceding vehicle on the road, a switching on of the mirror heating, a memory function for the mirror adjustment motor, turn signal blinkers, or the presence of persons in the non-visible dead zone can be captured and subsequently converted into display.

Based on the fact that display elements are arranged behind the mirror pane and must radiate through the mirror pane, there arises the advantage, on the one hand, that the display image evolved from display element emission appears practically directly on the already reflecting surface of the mirror. Furthermore, the enclosed display elements are protected from weather and environmental hazards. However, there arises due to the radiation through the mirror pane a certain weakening of the displayed image which is observed by the driver. In unfavorable light situations, this can lead to a situation wherein the visual light projected into the mirror pane of the rearview mirror cannot be read or deciphered or is only poorly recognizable.

On this account, in accord with another embodiment of the present invention, the reflective coating of the surface area immediately in front of the display elements is at least partially removed. This permits the emanated display to proceed from the display element to the visualizing surface with the least hindrance through the transparent or translucent material of the mirror pane. Thus the display is not weakened. In order to prevent that by this partial removal of the reflective coating the rearview mirror, that is, its reflective layer, appears to be "perforated", in accord with yet another advantageous embodiment of the present invention, the removing of the reflective layer is carried out in the form of thin, incised lines, parallel to one another or in the form of small, individual dots. Again, filling a surface shape sized to conform to the emitting aperture of the display element, the above removing means are applied to the mirror front surface.

In particular, when the removed surface of the mirror is in the form of thin, incised lines, parallel to one another or in the form of small, individual dots, this removing of the mirror coating is essentially no longer visible from a certain observational distance, and essentially does not impair the presentation of the mirror image. A further possibility is to so abrade the reflective layer with distinctive symbols or so-called pictograms which illuminate when one or another of the several display elements behind the reflective layer are activated.

In order to prevent possible divergent radiation, or halo formations about the true point of light, or images, the back side of the mirror with the exception of the transparent areas for visible light or radiation can be covered with, for instance, a lacquer coating.

The partial removing or abrasion of the reflective layer can, for instance, be carried out by a precision laser, by an etching procedure, by sand blast abrasion, by incision of lines, or by a masking done when the reflective mirror coating was applied.

The direction of radiation of the display elements can be at an angle either away or toward the observer, so that the resulting image in various directions appears differently intense or bright, and also clear or less clear, i.e., to the point of not being seen at all. The radiation direction of the display elements can be directed through lenses, which are ground into the material of the mirror pane or are fastened thereto.

The present invention also provides in another aspect, a rearview mirror having a mirror pane, in particular a rearview mirror for motorized vehicles, wherein the rearview mirror is characterized, in that behind the mirror pane, an apparatus for taking pictures is placed.

By the term "apparatus for taking pictures" it is to be understood, for the present invention and in the widest scope, an element which receives incoming radiation within a definite wave spectrum, or else an apparatus responsive to such radiation. Further, the incoming radiation must be convertable into a displayed and visible picture by the element or apparatus.

In a concrete embodiment example and in accord with a preferred embodiment form of the present invention, the picture taking apparatus is a camera. By this means, it is possible to display a picture taken by the camera on a monitor or on the instrument panel of the vehicle. Since, in this matter, the picture taking apparatus, i.e. the camera, can have a direction of view differing from that of the plane of the mirror, then the camera has the ability to display a picture from a different area than that of the mirror. The driver of the vehicle sees in the mirror surface of the rearview mirror a partial view of the zone lying behind or to the side of the vehicle and sees in the monitor another zone lying behind or to the side of the vehicle. The latter will be as the view is caught by the picture taking apparatus. The rearview mirror of the present invention thus unifies, more or less, two rearview mirrors into one, without the requirement that the size of the mirror surface and/or the number of the mirror surfaces be increased.

The direction of the view of the picture taking apparatus can be entirely different from that of the surface of the plane of the mirror glass. Thus, for instance, the picture taking apparatus can be directed downward at a right angle to the pane of the mirror, in order to enable the driver of the vehicle to supervise the area before and behind the front axle. The remaining areas, to the side or behind the vehicle will be observed as seen in the mirror surface.

In accord with a further advantageous embodiment, the picture taking apparatus, however, can also "see" through the mirror pane. It is known, that mirror panes of mirrors, have less than one-hundred percent reflecting powers, but show also a certain translucence. This translucence can be sufficient to allow a response from the picture taking apparatus set behind the mirror pane.

Advantageously, however, the reflective mirror layer of the mirror pane is at least partially removed in an area in front of the picture taking apparatus in order to achieve a locally improved transparency of the mirror pane. This partial removal of the mirror layer can, for instance, be made in the form of fine lines, essentially parallel to one another, or in the form of single dots. If a mirror layer of this kind is partially removed, then the rearview abilities of the rearview mirror is only immaterially reduced. However, a substantially greater translucency of the mirror pane is achieved. The partial removal of the mirror layer can, for instance, be made by means of a laser, or by etching or through a fine line scoring process, or yet even by corresponding masking when the reflective mirror layer was applied.

The picture taking apparatus is preferably in the form of a camera, and more preferably a CCD camera, which can have sensitivities either in the area of visible light, or in the area of infrared light. If, in these cases, the camera is augmented by at least one radiation emitting element of a corresponding wave length, then, in the case of bad visibility, (at night, in fog or heavy rain, etc.) improved visibility is achieved by the picture taking apparatus or camera. Particularly, when the picture taking apparatus is sensitive to infrared light, use of a lamp emitting in the infrared spectrum, can provide a sufficiently clear and well illuminated field of vision without degradation of the surroundings, that is, for instance, without glare. The same advantageous effect may be obtained also with one or more light emitting diodes (LED) as radiation element(s).

It will prove advantageous, if the radiation emitting element, of which there is at least one, is at least automatically and simultaneously activated as the camera is switched on.

The direction of viewing of the picture taking apparatus is best changeable and in this vehicle case especially advantageous if it is changed by remote control. In doing this, it is possible, for instance, to change the direction of view from the driver's seat by a control lever, or joystick. The desired or required viewing direction can be quickly adjusted this way and, moreover, quickly modified upon change of drivers.

As already mentioned, the picture taking apparatus is connected to a picture evaluation means and to a display module, in order to make the picture gained from the picture taking apparatus visible on a monitor or on the instrument board.

It should be understood, that the object of the present invention applies in like manner, to a rearview mirror, which contains two or more picture taking apparatuses or cameras. Further that these picture taking apparatuses or cameras may possess respectively different directions of view or may be, as is preferred, governed by remote control to obtain changeable directions of view.

BRIEF DESCRIPTION OF THE DRAWINGS

Further details, aspects, and advantages of the present invention may be found in the following description given with the aid of the drawings, which description is to be understood as illustrative, and purely based on examples. There is shown in:

FIG. 1 a partial sectional view through a rearview mirror assembly in accord with the invention, with a display element placed behind the mirror pane;

FIG. 2 a front view of a mirror pane with an arrangement of possibilities for display elements;

FIG. 3 a partial sectional view through a lens ground into the mirror pane;

DETAILED DESCRIPTION OF THE PREFERRED EMBODIMENTS

Figure 4:
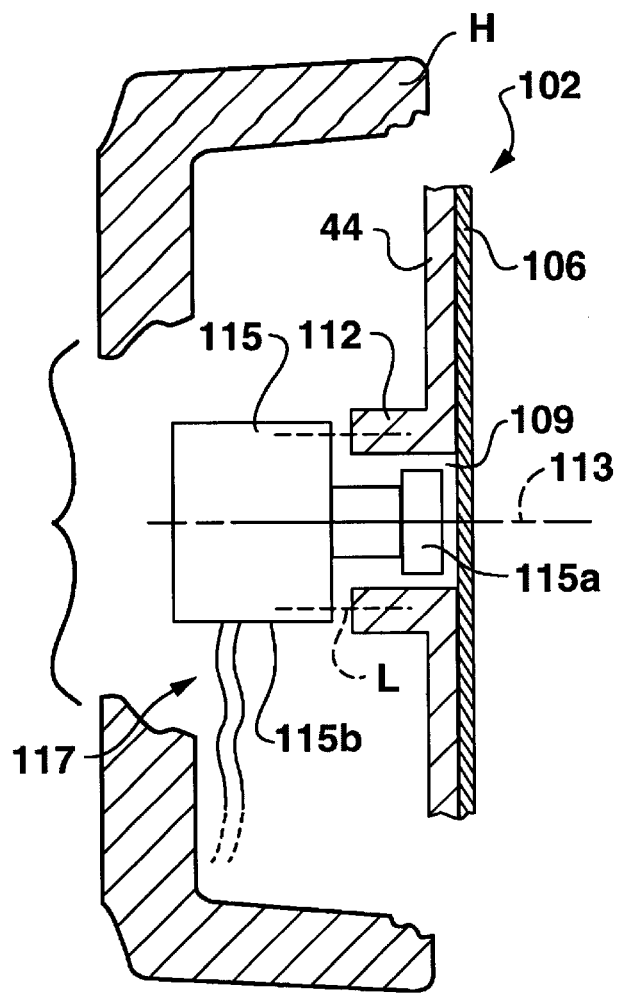
FIG. 4 a schematic and simplified section through a portion of a rearview mirror in accord with the invention.

Reference will now be made in detail to one or more preferred embodiments of the invention. The disclosure is provided by way of explanation of the invention and is not meant as a limitation of the invention. Thus, the present invention includes any modifications and variations of the following examples as come within the scope of the appended claims and their equivalents.

A rear view mirror, designated in the drawing generally as 2, exhibits a laminate construction as shown in the sectional view FIG. 1, with a carrier plate 4 and a mirror pane 6 fastened thereon. The rearview mirror 102, in the embodiment shown in FIG. 1, is designed as a so-called front surface mirror, which is to say, the mirror pane 6 has the reflective coating or layer not on the rear surface in proximity to the carrier 4, but on the free exposed surface. An example of this kind of mirror pane 6 is a mirror of chrome-glass.

The carrier plate 4 serves for the mounting of at least one, or preferably a plurality of, display elements 8 located behind the mirror pane 6, thus being in the interior of the rearview mirror 102. In FIG. 1 the display element 8 is designed in the form of an LED 10. For the secure anchoring of the LED 10, the carrier plate 4 possesses a socket 12 which conforms to the outer contour of the LED 10, in which the LED 10 is inserted and, if necessary, is also held with adhesive. In the area of the socket 12, the carrier plate is opened so that the LED is allowed to lie directly behind the mirror pane 6. The electrical connecting members 14 and 16 of the LED 10 are soldered at a board 18, which has the necessary supply and control wiring. Preferably, the board 18 is in the form of a so-called circuit board. The board 18 can, for instance, be supported on the carrier plate 4, as is indicated in FIG. 1 by the dash-dot-dot line. In case of necessity, or if so desired, between the front side or the forward end of the LED 10 and the back side of the mirror pane 6, a focusing lens (not shown) can be placed. This lens then takes care that light emitted from the LED 10 strikes the rear side of the reflective mirror layer 6 essentially in a vertical direction, so that less refractive and reflective error occurs and the amount of light available is used to its greatest extent. Further, such a focusing lens permits a bundling and thus an intensifying of the light emitted by the LED 10, which light continues through the mirror pane 6.

The direction of the radiation emitting display element can also proceed at an angle either to or from the observer, so that the image produced by the display element from various directions appears differently intense or bright, also clearer or less clearly, even to the point of not being seen at all. Thus other persons, i.e. passengers, are not disturbed. The direction of radiation of the radiation emitting display element can, in this respect, be directed through lenses, which lenses are either ground into the material of the mirror pane or fastened thereto.

Instead of the one-piece design of the socket 12 on the carrier plate 4, the socket 12 can be a separate component which is clipped onto the carrier plate 4 or affixed thereto by adhesive, or otherwise fastened.

Also, in the case of another embodiment of the radiation emitting display element, this too can be secured by adhesive directly on the back side of the mirror pane.

FIG. 2 shows a view from the front of a surface section of the mirror pane 6 of the rearview mirror 102 in accord with the present invention. In the embodiment shown in FIG. 2 are presented a total of three LEDs 10 and display elements 20a, 20b and 20c which lie adjacent to one another. FIG. 2 shows also the possibility, that instead of using an LED or a pilot light behind the mirror pane 6, a so-called seven segment display 22 may be employed, which also projects its image through the material of the mirror pane 6. Through the assembly of a plurality of LEDs and/or a plurality of seven segment displays, the presentation of complex information or data can be made on the surface of the mirror pane 6. Amplification permits the additional effect, that different colored LEDs or display pilot lights can be used, particularly in the colors green, yellow and red.

Further, the display elements 8 can be grouped together in the surface of the mirror pane 6, or otherwise arranged, in order to make certain information or displays even more noticeable.

Instead of light emitting display elements, that is, display elements which emit light in the visible range, for certain application cases—as explained already above—it can be of advantage to use display elements which emit in the infrared spectrum, that is, the so-called IR-diodes. For instance, the use of LEDs in the IR spectrum is of advantage if a camera is installed. Such a camera would be mounted externally on the vehicle and would monitor such areas in dead zones which cannot be seen by the driver. IR-diodes together with an IR responsive camera permit a monitoring or presentation of pictures without detriment to the immediate surroundings, that is, by glare. In this connection be advised to refer to the German Patent App. No. 199 02 486.3, incorporated by reference herein. In the text therein contained, a particularly advantageous camera for this service is described.

Based on the radiation passage emanating from the display element 8 and passing through the material of the mirror pane 6 and thereafter through the reflective mirror coating, a certain weakening of the emitted light, or other radiation, from the display element 8 occurs. Although this can be partly compensated for by the use of, for instance, high capacity LEDs, in accord with yet another preferred embodiment, the reflective coating of the mirror pane 6 in at least an area in front of the display element 8 can be partially removed.

FIG. 2 demonstrates a total of five possibilities, as to how this mirror coating of the mirror pane 6 in front of the display element(s) 8 can be can be removed. In the case of the display element or the LED 20a, the reflective mirror coating is in the form of very thin, incised lines, essentially closely aligned and parallel to one another. These lines 24 can run horizontally, diagonally or vertically and lie in front of the display elements 8 or the LED 20a. Because of the removing of the mirror coating by the thin lines 24, on the one hand, a clearly greater portion of the radiation emitted from the display element 8 can pass through to the outside, on the other hand, the reflective character of the mirror pane 6 will only be immaterially affected.

The same, or similar effects, can be achieved wherein the reflective layer is partially removed by a plurality of individual small dots 26, as this is indicated in FIG. 2 in the case of the LED 20c.

A further possibility for the set-back of the reflective coating would be to partially remove this in the shape of one of the radiation emitting surfaces of the size of corresponding surface 28 of the display element. Since the size of the surface 28 essentially represents only the size of the radiation emitting surface of the display element (LED 20b), by this procedure, the surface of the mirror pane 6 likewise is only immaterially affected.

Also, in front of the seven segment display 22 or in front of a plurality of seven segment display, for instance lines 24 or dots 26 can be designed into the mirror reflective layer, in order to increase the transparency of the mirror pane, that is to say, the reflective coating on said mirror pane.

Further, the reflective coating can be partially removed in the form of symbols and pictograms. As an examples, we would name here a symbol 30 as an ice warning and a symbol 32 for the mirror heating in FIG. 2.

The design of the lines, dots, or surface 24, 26 and 28 can be made by a laser, by an etching procedure, by sand blasting, or by scoring. The design can also be made by corresponding masking when the reflective coating is applied on the mirror pane 6.

The display element(s) can be equipped with a common or separate acting dimmer function, in order to be able to adjust the current optimal or desired degree of brightness.

The direction of radiation of the radiation emitting display element can, upon requirement, be inclined away from an observer, or it can be directed toward the observer, so that the display element appears differently intense or bright, or clear or less clear, even to the point of not being seen at all. Other persons thus, for instance, a passenger, need not be disturbed by the display. The radiation direction of the radiation emitting display element can be directed, in this matter, through lenses either ground into the material of the mirror pane or adhesively affixed. FIG. 3 shows an example of a ground lens 34.

In order to prevent possible divergent radiation, or halo formations about the true point of light, or image emanations, the back side of the mirror 6, with the exception of the transparent areas for visible light or radiation can be covered with, for instance, a lacquer coating. FIG. 3 shows the arrangement with the lacquer coating 36 applied around the lens 34. In the case of FIG. 1, the lacquer coating 36 was applied between the carrier plate 4 and the mirror pane 6 around the socket 12. More exactly the lacquer was applied around the radiation emanation opening 38 defined by the socket.

Within the framework of the present invention, it is possible to merge data into the existing reflected images in the rearview mirror. For instance, in the case of back-up aid, the driver, during back-up maneuvering, wherein he has to use his rearview mirror, receives simultaneously data from the back-up aid concerning the separation distance to an obstacle or to the target of the maneuvering, so the gaze of the driver need not wander back and forth continually between the rearview mirrors and the back-up display on the instrument board. Also other data may be presented, for instance the outside temperature, and the like. Furthermore, warning or advice signals can be blended into the surface of the rearview mirror 102.

Since the display elements 8 lie behind the mirror pane 6 and the carrier plate 4, they are guarded from contamination and environmental influences and reliably protected.

In a further aspect of the invention, a rearview mirror, in its totality designated as 102, is designed in accord with FIG. 4, having a mirror pane 106 and a supporting carrier plate 104 bearing the mirror pane 106. Mirror pane 106 and carrier plate 104 are supplied on their peripheral rims with a characteristic framing and set into a rearview mirror housing H.

The rearview mirror 102, in accord with FIG. 1, is constructed as a so-called front surface mirror, that is, the mirror pane 106 does not have the reflective coating or the reflective layer on the surface proximal to the carrier plate 104, but bears this on the free outer surface. An example of such a mirror pane 106 is a mirror pane of the so-called Chrom-Glass.

It can be further inferred from FIG. 4, that the carrier plate 104 exhibits at least one opening or recess 109, wherein in this recess is installed a socket 112 projecting from the interior of the mirror housing H. The socket 112 can be fabricated as peripherally closed as to the sides, or it can be comprised of a plurality of clips protruding from the plane of the carrier plate 104. In the inner space defined by the socket 112, behind the mirror pane 106 and within the recess 109, is located the radiation receiving part 12 of a picture taking apparatus 115. The picture taking apparatus 115 is, for instance, affixed in the socket 112, as is indicated in FIG. 4 by the dotted lines L. A plurality of cables or signal lines 117 run to and from the picture taking apparatus 115.

If the picture taking apparatus 115 is a camera, particularly a CCD camera, the radiation receiving part 115a, behind the mirror pane 106, represents the objective lens of the camera.

In the presented schematic illustration of FIG. 4, the optical axis 113 of the picture taking apparatus 115 or the camera, stands essentially at right angles to the mirror pane 106. This means, that the picture taking apparatus or the camera 115, receives essentially the same picture as is reflected upon the mirror pane 106 of the rearview mirror 102. In practice, the optical axis of the camera 115 would instead be angled to the plane of the mirror pane 106 or so inclined that the camera takes a different picture than that which is reflected or reproduced on the mirror pane 106.

Figure 5:
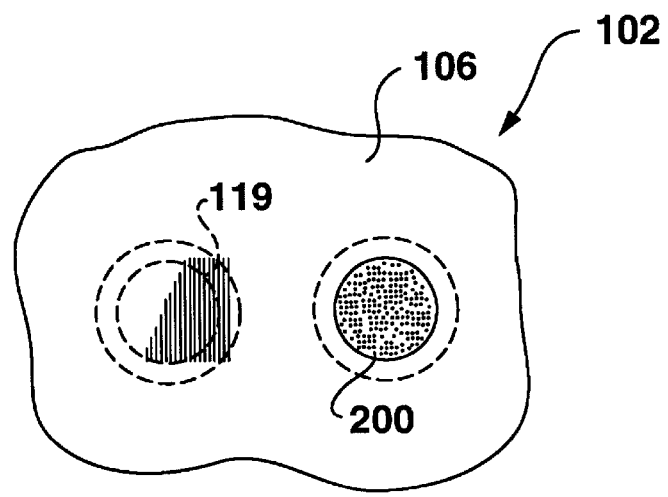
FIG. 5 likewise, a schematic front view of a portion of a mirror pane of a rearview mirror in accord with the invention.

In order to increase the already present radiation or light input on the radiation receiving part or objective lens 115a, it is possible, in accord with FIG. 5, to make a partial removal of the reflective layer of the mirror pane 106 immediately in front of the radiation receiving part or the objective lens 115a. This can be done by a plurality of thin, incised lines 119, which are essentially parallel to one another.

Alternate to this is a plurality of small dots 200, distributed as shown in the right side of FIG. 5.

This partial removal from the reflective layer of the mirror pane 106, in front of the radiation receiving part or the objective lens 115a, greatly improves the translucency of the mirror pane 106. Further, this does not essentially impair the reflective capabilities of the mirror, that is to say, the appearance of the reflected image as presented on the mirror pane 106 remains undiminished.

For making the partial removal of the reflective mirror layer from the mirror pane 106, a laser, an etching process or the inscription of parallel lines may be employed.

In the embodiment shown in FIG. 4, the optical axis 113 of the picture taking apparatus, or camera 115, coincides with another axis, both shown in FIG. 4 by a dotted line 113. The two axes stand perpendicular to the surface of the mirror pane 106. As already explained, advantageously, the optical axis 13 of the picture taking apparatus or camera 115 deviates from the other axis which is perpendicular to the surface of the mirror pane 106, in order to attain a different direction of view by the picture taking apparatus or the camera 115. This will result in a view, which is different from that which is attainable by the mirror pane 106. Thus, for example, the picture taking apparatus can be even directed downward at a right angle to the mirror pane, in order to enable the driver of the vehicle to see the area before and behind the forward axle. The remaining areas, at the side and/or the vehicle, are then seen in the mirror pane. Also, the direction of the picture taking apparatus can be turned into the direction of travel, or can at least approach the direction of travel.

In an advantageous embodiment, the arrangement of the picture taking apparatus 115 behind the mirror pane 106 can be so carried out, that the optical axis 113 or direction of view of the picture taking apparatus 115 is adjustable or changeable. To accomplish this, it is preferential to bring about the adjustment or the change of the optical axis or direction of viewing of the picture taking apparatus 115 by the remote control of one or more motors. Such motors move a housing 115b of the picture taking apparatus 115 and facilitate the pivoting or rotational movement thereof.

The control of the motors can be carried out by the driver of the motor vehicle by means of corresponding buttons or with a joy-stick like selection lever.

As an alternative to this, or even in addition hereto, there can also be a plurality of picture taking apparatuses 115 with different directions of view installed either immovably or controllably movable within the housing H of the rearview mirror.

The picture produced from the picture taking apparatus or the camera 115 is then displayed on a monitor (not shown) in, or on the instrument board of the motor vehicle.

If a plurality of picture taking apparatuses or cameras are used, then the different pictures can be displayed on the monitor either alternately, or by a multiple image technique on the monitor screen.

In order to obtain a better picture from the picture taking apparatus or camera 115 in bad weather, for instance at night, in fog or the like, the picture taking apparatus can operate with one or more, possibly combined, radiation emitting elements, which are located on the rearview mirror housing H or also behind the mirror pane 106. Further radiation emitting devices can, for instance, be disposed at the rear of the vehicle, in the form of one or more light emitting diodes, or one or more other types of lamps. In this case, the wave length of the radiation emitter elements is preferably so chosen so that such wave length matches the maximal sensitivity areas of the picture taking apparatus 115.

The radiation emitting element(s) (LEDs, etc.) are preferentially automatically switched on simultaneously with the activation of the camera.

In this matter, a light level sensor can be provided, which, below a specified threshold level of illumination, switches on the radiation emitting elements. The activation threshold of the sensor is preferably adjustable, in order to comply with a subjective level of turning on the radiation emitting elements as determined by the driver.

In regard to the arrangement of the radiation emitting elements behind the mirror pane 106 of the rearview mirror 102, then reference is to be made to the parallel German Patent Application of the same applicant with the title "Rearview Mirror" German App. No. 19902487.1 incorporated by reference herein.

If the picture taking apparatus or camera 115 in the rearview mirror 102, is especially sensitive in the infrared spectrum and IR-diodes are employed as radiation emitting elements, then, without impairing (that is with no glare) the view of the immediate vicinity, a sufficient illumination and observation of areas to the side, front and to the motor vehicle can be carried out.

By the arrangement of one or more of the picture taking apparatuses, within the interior of the rearview mirror housing H, these apparatuses are protected from storm influences and are reliably protected.

It will be apparent to those skilled in the art that various modifications and variations can be made in the present invention without departing from the scope and spirit of the invention. It is thus intended that the present invention include such modifications and variations as come within the scope of the appended claims and their equivalents.

That which is claimed is:

1. A mirror assembly for a vehicle comprising:
   a housing configured for attachment to the vehicle;
   a mirror pane configured for attachment to the housing, the mirror pane having a reflective surface defining a first portion and a second portion, the reflective surface being partially removed such that the first and second portions are partially reflective and partially transmissive;
   at least one picture taking apparatus located on a rear side of the mirror pane and adjacent the first portion of the mirror pane;
   a sensor located on the rear side of the mirror pane for sensing an ambient light level; and
   a radiation emitting element located on the rear side of the mirror pane, the second portion being disposed in front of the radiation emitting display element such that the radiation emitting element emits light at least partially through the second portion, the radiation emitting element being activated upon the sensor element sensing an ambient light level below a predetermined level.

2. The mirror assembly of claim 1, wherein the second portion forms a symbol.

3. The mirror assembly of claim 1, wherein the second portion includes a pictogram.

4. The mirror assembly of claim 1, wherein the first and second portions are selected from the group consisting of removal by laser, etching, scoring, sand blasting, and combinations thereof.

5. The mirror assembly of claim 1, wherein the picture taking apparatus is a camera sensitive to visible light.

6. The mirror assembly of claim 1, wherein the picture taking apparatus is a camera sensitive to infrared light.

7. The mirror assembly of claim 1, wherein the picture taking apparatus is activated upon the sensor sensing the ambient light level below the predetermined level.

8. The mirror assembly of claim 1, wherein the radiation emitting element emits radiation in a wave length visible to the picture taking apparatus.

9. A mirror assembly for a vehicle comprising:
   a housing configured for attachment to the vehicle;
   a mirror pane configured for attachment to the housing, the mirror pane having a reflective surface defining a first portion, a second portion, the reflective surface being partially removed such that the first and second portions are partially reflective and partially transmissive, wherein a viewing axis is movable relative to an axis perpendicular to the reflecting surface;
   at least one picture taking apparatus located on a rear side of the mirror pane and adjacent the first portion of the mirror pane;
   a sensor located on the rear side of the mirror pane for sensing an ambient light level; and
   a radiation emitting element located on the rear side of the mirror pane, the second portion being disposed in front of the radiation emitting display element such that the radiation emitting element emits radiation at least partially through the second portion, the radiation emitting element being activated upon the sensor element sensing an ambient light level below a predetermined level, wherein the direction of radiation is capable of being inclined away or towards a driver.

10. The rearview mirror assembly of claim 9, further comprising a lens disposed on the mirror pane, the direction of radiation of the radiation emitting element being directed through the lens.

* * * * *